United States Patent [19]

Andoe

[11] Patent Number: 5,571,312
[45] Date of Patent: *Nov. 5, 1996

[54] ENVIRONMENTALLY SAFE EPOXY ADHESIVE-COPPER HULL COATING AND METHOD

[75] Inventor: Graham C. Andoe, Dunwoody, Ga.

[73] Assignee: Cresco Inc., SA., St. John's, Antigua/Barbuda

[*] Notice: The term of this patent shall not extend beyond the expiration date of Pat. No. 5,336,304.

[21] Appl. No.: 581,336

[22] Filed: Dec. 29, 1995

Related U.S. Application Data

[63] Continuation-in-part of Ser. No. 506,070, Jul. 24, 1995, abandoned, which is a continuation-in-part of Ser. No. 273,133, Jul. 14, 1994, abandoned, which is a continuation-in-part of Ser. No. 920,927, Jul. 28, 1992, Pat. No. 5,336,304.

[51] Int. Cl.$^6$ .............................. C09D 5/16; A01N 25/00
[52] U.S. Cl. ..................... 106/18.32; 106/18.33; 106/18.35; 424/78.09; 424/638; 504/150; 504/158; 514/372; 514/643; 523/122; 523/177; 524/434
[58] Field of Search .......................... 106/15.05, 18.32, 106/18.35, 18.33; 424/78.09, 630, 638; 504/150, 158; 514/372, 359, 643; 523/122, 177; 524/434

[56] References Cited

U.S. PATENT DOCUMENTS

| | | | |
|---|---|---|---|
| 3,761,334 | 9/1973 | Zondek | 156/71 |
| 4,115,130 | 9/1978 | Crump et al. | 106/18.33 |
| 4,410,363 | 10/1983 | Supcoe et al. | 106/18.32 |
| 4,468,310 | 8/1984 | Sabins | 204/197 |
| 4,496,444 | 1/1985 | Bagnulo | 204/148 |
| 4,621,112 | 11/1986 | Backhouse et al. | 106/404 |
| 4,639,385 | 1/1987 | Jolitz et al. | 427/386 |
| 4,772,344 | 9/1988 | Andoe | 156/64 |
| 4,806,432 | 2/1989 | Eguchi et al. | 428/457 |
| 4,828,771 | 5/1989 | Kishima et al. | 264/41 |
| 4,908,275 | 3/1990 | Tsuji et al. | 428/457 |
| 4,937,274 | 6/1990 | Arima et al. | 106/480 |
| 5,035,759 | 7/1991 | Andoe | 156/64 |
| 5,044,293 | 9/1991 | Andoe | 156/71 |
| 5,106,525 | 4/1992 | Sullivan | 252/162 |
| 5,173,110 | 12/1992 | Stovicek | 106/18.32 |
| 5,336,304 | 8/1994 | Andoe | 106/18.32 |

*Primary Examiner*—Anthony Green
*Attorney, Agent, or Firm*—H. Jay Spiegel

[57] ABSTRACT

The present invention describes in detail new environmentally safe marine vessel hull coating formulations for all outer surfaces of all marine vessel surfaces specifically designed to fully comply with all existing and anticipated environmental regulations. These formulations absolutely prevent water ingress, galvanic corrosion, wood decay, worm ingress, attachment by grass, algae and marine organisms, flex to accommodate to hull motions and protect against impact damages and may last for 20 years of the economic life of the marine vessel. These inventive formulations embody specific encapsulation techniques that allow aluminum and large steel hulls to now use these advanced coating products since they do not contain any toxins or co-toxins thereby eliminating the concern about the existing TBT exemptions. The specific materials which are applied to the marine vessel hulls are specified and include an epoxy adhesive resin mixed with copper powder and a thixotropic agent to cause the coating to maintain its shape and configuration while curing. Also included are grass and algae retardants consisting of pH reducers as well as biocides. The use of isopropyl alcohol is also described along with a unique hardener. A relationship between the particle sizes of the thixotropic agent and the copper powder is described. Their mixing procedures, mixing ratios, storage procedures, packaging procedures, shipping procedures, application procedures and maintenance procedures are also fully disclosed in detail. Also disclosed are the specific formulation variables to adapt the products to meet a wide range of end user specifications including a fairing composition incorporating solid or hollow ceramic particles.

18 Claims, No Drawings

ENVIRONMENTALLY SAFE EPOXY ADHESIVE-COPPER HULL COATING AND METHOD

BACKGROUND OF THE INVENTION

This application is a Continuation-in-Part of application Ser. No. 08/506,070 filed on Jul. 24, 1995, now abandoned, which is a Continuation-in-Part of application Ser. No. 08/273,133, filed on Jul. 14, 1994, now abandoned, which is a Continuation-in-Part of application Ser. No. 07/920,927, filed Jul. 28, 1992 now U.S. Pat. 5,336,304 issued Aug. 9, 1994.

The early work of Woolsey was an improvement upon the ancient art of coating marine vessels with pitch and pepper in an early documented attempt to prevent wooden hulls from being eaten or rotting. Woolsey and others came upon the idea of cheap, yet dangerous, cuprous-oxide, an established toxin, to mix with a binding agent of very low holding power. A small update of that product was developed by Scott Bader of England who modified the Woolsey technology to change the binding agent to polyester resin. This polyester resin base anti-foulant contained styrene in environmentally unacceptable levels. In addition, polyester resin has proven itself to be the major cause of water ingress damage to fiberglass and fiberglass composite hulls such as osmotic blistering. The polyester resin systems also allow quick water permeation into steel and aluminum hull surfaces causing significant hull profile changes from water induced corrosion and rusting. Osmotic blistering is identified by all marine experts as the single most expensive repair cost on a fiberglass hull. Once that "osmosis" has set in and repairs are made, the likelihood of the recurrence of this "boat pox" is very high.

Polyester resin exposure causes extensive damage of a serious and permanent nature to those exposed to the fumes of the thinning or reducing agent, styrene. In another aspect, the polyester resin, which may be used as the binder in the hull construction lay up procedure or in the outer hull coating, has been found to require resin-hardener ratio changes of a very frequent nature depending upon ambient conditions. The catalyzer (MEKP) ratio should be changed with every five degrees change in ambient temperature and must be adjusted for humidity changes as well. For example, in Miami where open boat hull lay ups are done, the current temperature changes are: low temperature 73 degrees Fahrenheit in the morning and, at 2:30 p.m., 93 degrees. Since the temperature will change 20 degrees on a typical summer day, the catalyzer (MEKP) ratio must be changed no less than four times for temperature effects.

In addition, the humidity also exerts a significant detrimental influence upon the strength of polyester resin. For example, as the dewpoint changes approximately five points, the catalyzer (MEKP) ratios should be changed. Typical value changes in Florida show a humidity of 90% in the morning and approximately 50% in the afternoon. Using the same 5 point differential change requirement, the result is eight changes in resin formulations for humidity changes combined with the four temperature caused reformulations for a total of twelve changes in a typical day.

Understanding the difficulties with polyester resin from environmental and practical standpoints, Applicant set out to develop a hull coating which would render a hull impervious to water incursion, would be safe to apply, would prevent attachment by marine organisms and which would be environmentally safe.

In developing the present invention, after a great deal of research, two general resins categories were focused upon: an epoxy modified polyester called vinyl ester and epoxy adhesive itself. Because of short shelf life concerns for vinyl ester, the Applicant selected epoxy adhesive and set to work selecting additional candidates most likely to succeed as a hull coating. The selection was narrowed to the Araldite 106/103 adhesive family produced by Ciba-Geigy. The solid ingredients were metallic copper powder/flakes and a water insoluble thixotropic agent added to cause the coating to keep its configuration while curing on a hull.

While it is known to employ thixotropic agents to maintain gelcoat shape while curing, Applicant is unaware of the use of water insoluble thixotropic agents. In fact, on page 65 of the February/March, 1992 issue of Professional Boatbuilder Magazine, Technical Editor, Bruce Pfund, cites the use of water soluble thixotropic agents as a culprit in the formation of osmotic hull blistering. Applicant has, therefore, employed, solely, water insoluble thixotropic agents.

Numerous immersion tests were done all of which proved satisfactory. Under supervised laboratory conditions, immersion tests were started using the Applicant's formulations using Araldite 103/106 adhesive. Immersion tests were done on clear plastic coupons immersed in distilled water, a highly penetrating fluid. Unacceptable levels of water penetration were found on all other types of epoxy binders.

The following prior art is known to Applicant:

U.S. Pat. No. 3,761,334 to Zondek
U.S. Pat. No. 4,468,310 to Sabins
U.S. Pat. No. 4,496,444 to Bagnulo
U.S. Pat. No. 4,772,344 to Andoe
U.S. Pat. No. 4,806,432 to Eguchi et al.
U.S. Pat. No. 4,908,275 to Tsuji et al.

None of these references teaches or suggests the inventive hull coating and method. Zondek suggests use of an epoxy paint under a metal foil. This in no way teaches or suggests the present invention. Sabins teaches an aluminum marine anode designed to prevent hull corrosion. Bagnulo teaches a method of corrosion protection including a strip or band of aluminum, zinc, magnesium or alloys thereof which is mounted on a metallic structure through the use of an electrically conductive adhesive. The present invention differs from the teachings of Bagnulo as contemplating an epoxy adhesive resin mixed with particles and/or flakes of copper as well as a thixotropic substance and coated on a hull surface.

Andoe discloses a method of protecting the hulls of marine vessels from fouling. Andoe discloses an edge sealant designed to be used as an adhesive to seal a metallic foil to a hull. While Andoe contemplates an adhesive such as vinyl ester, epoxy, silicone, polysulfides or other waterproof adhesives mixed with powdered, milled, chipped or ground copper, copper/nickel or cuprous oxide, Andoe fails to teach or suggest utilizing an epoxy adhesive resin based hull coating including, mixed therein, both copper particles and a thixotropic agent. The Andoe patent fails to recognize the advantages of the present invention.

Eguchi et al. teach a copper/foiled laminated sheet for flexible printed circuit board. This patent is believed to be of only general interest concerning the teachings of the present invention.

Tsuji et al. teach a film carrier and method of manufacturing same including a resin based film and rolled copper foil laminated thereon. Of course, Tsuji et al. fail to contemplate coating of a boat hull with an epoxy adhesive based resin mixed with copper particles and a thixotropic agent.

Applicant is also patentee in U.S. Pat. No. 5,035,759 issued Jul. 30, 1991 and U.S. Pat. No. 5,044,293 issued Sep. 3, 1991. This application has been filed within one year of the respective dates of issuance of these patents.

SUMMARY OF THE INVENTION

The present invention relates to environmentally safe epoxy adhesive-copper hull coatings and method of applying. The present invention includes the following aspects and features:

(A) In a first aspect, the inventive formulation is specifically intended to set a new high standard for OSHA compliance in that it is greater than 99% total solids and does not contain any volatile organic compounds. The formulations contain an extremely high concentration of non-water permeable, non-water soluble ingredients, up to 99% by volume, to prevent osmotic blistering on fiberglass hulls which have inherent tendencies to absorb water. Since the outer surfaces of all marine vessels move while the vessel is being lifted into or out of the water and the surfaces do move a considerable distance with a significant displacement from their original location caused by a combined resultant of forces generated by a combination of vessel speed, wave impacts, vessel lifting, weight and balance considerations, elasticity of the hull and other forces, and since the formulations contain a uniquely high concentration of totally impermeable solids, and since the binding mechanism comprises a highly flexible adhesive of a permanently waterproof nature with extremely high tensile and lap shear strengths with a correspondingly high surface hardness, the inventive coatings protect a hull surface while maintaining their integrity.

(B) In another aspect, the water barrier coating does not allow any water to pass through it. All fiberglass hulls are ultimately permeable membranes which allow an osmotic water ingress into the hull. This water transfer results in a high water content within the laminate layers of a fiberglass hull. This documented water ingress then starts to dissolve any water soluble materials which then force any improperly catalyzed resin-hardener catalyzed products to come together under hydrostatic pressure. This pressure then continues to exert increasing pressures on both the water soluble and the uncatalyzed or improperly catalyzed products forcing them to come together with other products of a similar nature into a narrow stream. When enough such materials come together, typically after three years or more of water immersion service, the narrow stream has more external water pressure applied to it forcing the "goo" into a concentrated bulging pocket on the outer or inner surface of the fiberglass or composite hull. As time increases, the "goo" pocket expands into a blister. However, since natural forces must be balanced, as the decomposing/uncatalyzed products exit the interior of the marine vessels' interior laminate structure, water is drawn into the hull at an increasing rate. Up to 4,000 pounds of water has been found within the laminates of a hull through this process. When a vessel is hauled for the typical maintenance schedule of replacing zincs, checking the props, cleaning the hull, etc., open weeping sores will be noted on the hulls made by the most prestigious manufacturers. These sores are called by many names including "boat pox", blisters, osmotic blisters, and in some cases, result in major structural failures.

(C) In another aspect, it has been well established that the outer surfaces of a marine vessel must be smooth to increase fuel economy, increase nautical miles per gallon of fuel, increase speed, increase engine life while simultaneously decreasing fuel tank sizes and fuel carried as dead weight, design horsepower or repower requirements—in short, causing major cost savings during the construction and life cycle of the subject marine vessel. The inventive formulation, as compared to the rough surfaces of known hull coatings, is quite smooth.

(D) In another aspect, the inventive formulation is designed to last for the "economic life" an established marine criterion, on the outer surfaces of a marine vessel. This criterion requires that these specific formulations remain attached, do not dissolve, do not require regular recoatings, scrubbings, burnishings, sandings or any and all other such in-water or yard based processes. In fact, The Clean Water Act, just placed into effect in California, will be the national role model in 1992 with total national compliance expected. What this means to the owner of a marine vessel is specifically that in-water cleanings and scrubbings are banned because the EPA has determined that cleaning processes remove toxins from the outer surfaces of marine vessels and place them into the surrounding waters. It must be noted that the majority of hull coating manufacturers design their products for a typical Florida service life of 12 months or less so that they can sell more of their products. These products are designed to dissolve into the water.

(E) In another specific criterion, environmental safety will be assured if not enhanced if a product is placed in contact with the sea water that is found in a natural condition in sea water. Since elemental copper is found in sea water in a typical concentration of four parts per billion and since the primary intent of these formulations is to stop water ingress, through this formulation, the Applicant specifies pure metallic copper to meet the criteria of non-permeability and of being found in a natural state in sea water. In its natural state, elemental copper is used as a safe conduit for the greatest majority of domestic water supplies and is used in food and beverage preparation equipment.

(F) In another aspect, the inventive hull coatings are hard enough to withstand regular hard impacts caused by ever increasing water borne debris and poor operational procedures such as running aground. The inventive formulations meet the minimum criteria of no less than 220 days use per year for no less than 20 years at a typical speed of 30 knots. The coating will not wear away as typical paints now do.

(G) In another aspect, the inventive product totally encapsulates the metallic water barrier materials in such a dielectric manner that there is no contact or potential contact between any and all surfaces of different galvanic potentials or compositions.

(H) In another aspect, the inventive coating is run and sag free when applied to vertical, angled or overhead marine surfaces. Since the weight of the water barrier materials is significant, a non-water soluble thixotropic agent is added to the formulations to allow the coating to remain in place while cross linking occurs. The additional function of the thixotropic agent is to allow the outer surfaces of the coating to level out without the need for chemical flatteners or "fish eye" preventers. The thixotropic agent also resists water ingress, is nonconductive and is environmentally safe.

(I) In another aspect, the inventive coating is specified to be easily repairable in water because boat yards are decreasing in number with a resultant increase in their fees. The repair materials are compatible with epoxy adhesive and salt water and also meet the spirit, intent and specification of all environmental regulations while simultaneously bonding to and functioning with the undamaged hull coating.

(J) The inventive formulations are adaptable to existing surface primers so that there is no adverse interaction between the primer and the inventive formulation.

(K) The inventive formulations have an additional set of physical characteristics such as practical pot life, quick tack times and a 24 hour cure time at 70 degrees Fahrenheit.

(L) Furthermore, the coating, in a further improvement, complies with ASTM Standard D-1141, Section 6 and ASTM Standard Test Method D-5108-90 as modified for copper based paints and the forthcoming replacement ASTM Standard.

(M) Additionally, the effectiveness of the basic coating disclosed in the parent application is enhanced to make the coating resistant to grass and algae while the coating retains the basic required anti-crustaceous creature characteristics. In a first aspect, in this regard, Applicant has found that by lowering the pH of the inventive coating to within the range of 2.0–5.0, little, if any, marine growths from either invertebrates, grasses or algae will attach themselves thereto. A Trade Secret substance known by the Trademark "pHarlo", which is owned and produced by the Poseidon Management Trust, Ltd., may be mixed into the inventive formulation to so reduce the pH thereof. Alternatively, a microbiocide may be mixed into the inventive formulation. Applicant has found that an effective microbiocide comprises that which is marketed by Ashland Chemical Company under the Trademark "AMERSTAT 251". "AMERSTAT 251" includes, as active ingredients, 5-Chloro-2-Methyl-4-Isothiazolin-3-One, 1.5% by weight, 2-Methyl-4-Isothiazolin-3-One, 0.35% by weight, inert ingredients, 98.15% by weight.

(N) Also, the inventive improved formulation complies with the spirit and intent of existing and pending EPA regulations by using only EPA approved ingredients and those for which EPA approval is expected in their October 1995 regulations.

(O) Further, the inventive improved formulation is designed to become chemically and mechanically compatible with existing and future primers for metallic hulls and with other marine vessel coatings, paints and construction materials.

(P) Additionally, the inventive improved formulation also encompasses solvent replacement technology to further comply with OSHA and EPA goals and deadlines. In this aspect, the formulation may be modified to use water soluble variants of the basic Bisphenol A resin with appropriate hardeners to resist water incursion.

As such, it is a first object of the present invention to provide an environmentally safe epoxy adhesive-copper hull coating and method.

It is a further object of the present invention to provide such an invention including the use of a water insoluble thixotropic agent to prevent sagging while the coating is curing.

It is a still further object of the present invention to provide such a coating which may be applied to a hull in a plurality of sequential coats.

It is a yet further object of the present invention to provide such a coating in numerous embodiments, one of which employs Ciba-Geigy Araldite 106 adhesive resin, another of which employs Ciba-Geigy Araldite 103 adhesive resin, and at least a further one of which includes use of a modified aqueous liquid dispersion of Bisphenol A epoxy resin.

These and other objects, aspects and features of the present invention will be better understood from the following detailed description of the preferred embodiments.

SPECIFIC DESCRIPTION OF THE PREFERRED EMBODIMENTS

The inventive coating is disclosed in several preferred embodiments. In a first embodiment, disclosed in parent application Ser. No. 07/920,927, now U.S. Pat. No. 5,336,304, the coating is optimally made up of, by volume:

20% Ciba-Geigy Araldite 106 adhesive resin

20% Ciba-Geigy Araldite 953 adhesive hardener

20% metallic copper in powder/particle form

20% methyl ethylene ketone thinning agent, and

20% water insoluble thixotropic agent. In a second embodiment, disclosed in U.S. Pat. No. 5,336,304, the 106 adhesive resin is replaced with 103 adhesive resin and due to the low viscosity characteristics of the 103 adhesive resin, the thinning agent is eliminated and the hardener proportion is halved. In this embodiment, the constituent ingredients are, optimally, by volume:

2/7 103 adhesive resin

1/7 991 adhesive hardener

2/7 metallic copper

2/7 water insoluble thixotropic agent.

As also pointed out in U.S. Pat. No. 5,336,304, the above listed proportions for these two embodiments of the inventive formulation comprise the optimal proportions. Of course, the inventive formulations are not limited to these proportions and are still effective within prescribed ranges of proportions as follows:

| By Volume | 106 Resin Formulation | By Volume | 103 Resin Formulation |
| --- | --- | --- | --- |
| 20–60% | Copper Flakes/Powder | 20–60% | Copper Flakes/Powder |
| 5–30% | Thixotropic Agent (Microballoons) | 5–30% | Thixotropic Agent (Microballoons) |
| 5–20% | Thinner - methyl ethylene ketone or isopropyl alcohol | 20–30% | 103 Adhesive Resin |
| 20–30% | 106 Adhesive Resin | 50% of Resin Proportion | 991 Adhesive Hardener |
| Same as Resin Proportion | 953 Adhesive Hardener | | |

The Ciba-Geigy Araldite 106 adhesive resin is water insoluble and comprises a mixture of fumed silica, Di-N-Butyl Phtalate, Para-Tertiary Butyl-Phenyl Glycidyl Ether and Diglycidyl Ether of Bisphenol A. The Ciba-Geigy Araldite 953 adhesive hardener comprises a mixture of (N,N)-Dinethyl-Dipropyltriamine and Polyamide. The Ciba-Geigy Araldite 103 adhesive resin is water insoluble and comprises a mixture of Di-N-Butyl Phtalate and Diglycidyl Ether of Bisphenol A. The Ciba-Geigy Araldite 991 adhesive hardener comprises a mixture of Triethylene Tetramine, 2, 4, 6-Tris (Dimethylaminomethyl) Phenol, 2, 4, 6-Tris (Dimethylaminomethyl) Phenol and Polyamide.

Concerning the 106 adhesive resin formulation, the thinner which is specified comprises either methyl ethylene ketone or isopropyl alcohol. Methyl ethylene ketone comprises a volatile organic compound, as such, isopropyl alcohol is preferred. In a further aspect, where the 106 adhesive resin formulation is to be applied through rolling or brushing application, the thinner is not necessary. It is only where the 106 adhesive resin formulation is to be used in spraying application that the thinner is necessary to thin the formulation sufficiently to allow spraying. However, under such circumstances, the 103 adhesive resin formulation may be used, without thinner, for spraying operations and, as such, is the preferred formulation for spraying. Of course, the 103 adhesive resin formulation may also be applied through rolling and brushing techniques.

In another aspect, the 106 adhesive resin is a stock material which is commonly available. By contrast, the 103 adhesive resin must be custom ordered and manufactured by the manufacturer. As such, while the 103 adhesive resin formulation has the advantage of applicability using spraying application without the need for a thinner, the disadvantage lies in the need for custom ordering.

In two further embodiments, first disclosed in parent application Ser. No. 08/273,133, the constituent ingredients are combined together in the following proportions, by volume:

| 3rd Embodiment | |
|---|---|
| Dielectric insoluble epoxy resin: | 30% by volume |
| Dielectric insoluble hardener: | 23% by volume |
| Thixotropic, insoluble: | .04% by volume |
| Metallic copper particles: | 46% by volume |
| Modified isopropyl alcohol (99% pure) reducer: | balance |
| 4th Embodiment | |
| Dielectric insoluble epoxy resin: | 24% by volume |
| Dielectric insoluble hardener: | 24% by volume |
| Thixotropic, insoluble: | 3% by volume |
| Metallic copper particles: | 48% by volume |
| Modified isopropyl alcohol (99% pure) reducer: | 1% by volume. |

In the 3rd and 4th embodiments described above, the basic Bisphenol A resin is further defined as an aqueous liquid dispersion of Bisphenol A epoxy resin, a polyfunctional aromatic epoxy resin and any combination thereof specifically designed for water dilution and viscosity reduction. These resins and resin combinations may be used in any combination with amine curing agents and those agents which are defined as crosslinking agents that promote self-polymerization in a water dispersion and those curing agents and inventive combinations which are stable in an aqueous solution such as aromatic amines, aliphatic amines, dicyandiamide, and substituted imidazoles such as Epi Cure 3072, 3046, 3274, 3270, 3140, 8535, 2-Methylimidazole, melamine or urea-formaldehyde. These base stocks are sold commercially by Henkel, Shell and others.

Concerning Bisphenol A, before catalyzation is induced, Bisphenol A is water soluble. Thus, water may be used as a dilution agent and, also, water may be used to wash Bisphenol A from one's skin. After catalyzation has occurred, Bisphenol A is water insoluble.

In a further aspect, in the third and fourth embodiments, the basic formulation is adjusted to comply with the EPA slow release criteria as set out in current ASTM standard D-1141, D-5108-90 as modified for copper-based coatings and the forthcoming ASTM replacement test for metallic copper antifoulants.

Furthermore, if desired, the inventive hardener may include, as an ingredient, a suitable proportion of, for example, Aminoethylpiperazine. In this regard, a suitable formula for the inventive hardener is as follows:

| % by weight | |
|---|---|
| 3–9% | Aminoethylpiperazine (NJEIN or CAS number 800920-5162) |
| 64–70% | Aliphatic Polyamide (NJEIN or CAS number 800920-5106) |
| 12–18% | Aromatic Alcohol (NJEIN or CAS number 800920-5007) |
| 9–15% | Epoxy Resin (NJEIN or CAS number 800920-5201) |

Applicant has found that, concerning the 3rd and 4th embodiments, varying the hardener to resin ratio anywhere from 4:5 to 1:3, by volume, has no appreciable effect on the effectiveness of the coating. Furthermore, Applicant has found that the insulating (dielectric) nature of the coating is enhanced when the thixotropic particle size is maintained no larger than the particle size of the entrained metallic antifoulant.

Also, Applicant has found that after the mixed ingredients have been catalyzed and within application window of the product, to ensure that the homogeneous nature of the product is retained on the surface of a marine vessel hull, care is taken to prevent admitting additional air into the mixture. This step has been found to increase the effectiveness of all the new ingredients of the coating by locking into place all components when hardened.

Concerning the 3rd and 4th embodiments, Applicant has found that varying the weight percentage of the copper particles from 45–85% provides an effective antifoulant. However, the inherent characteristics of metallic copper do not include any significant anti-grass or anti-algae capabilities which are mandatory for a marine vessel hull in the pleasure vessel class that typically sits dockside six out of seven days.

To solve this problem, Applicant has found that lowering the pH to a pH level of 3 and in the range of 2–5, enhances effectiveness of the coating against grass and algae in a dramatic fashion. When the pH reducing chemical is combined within a slow release insoluble marine coating, the long term effectiveness of the coating is assured. In one preferred embodiment, the pH reducing chemical employed is known by the trade name pHarlo and is manufactured and distributed by Poseidon Management Trust. The formula for pHarlo is held as a trade secret, however, this chemical is described as follows: "a clear, odorless liquid with an extremely low pH in its concentrated form. As a log scale is used to measure pH you can not theoretically have a negative pH. However, the concentrate must be diluted many times to reach pH 0.0." pH reducing products marketed under the trade name pHarlo include an acid of Copper, a nitric acid and an acid of Sulphur. Any of the pHarlo chemicals may be employed in the ratio of from 1 ounce per quart up to four ounces per quart.

In some test results, it has been found that various grasses resist certain retarding agents. It has been found, for example, that at the same latitudes and same water temperatures, different grasses and growths will form on different agents, which has led to the Applicant's findings that additional anti-grass agents are effective in different parts of various bodies of water. Based upon these new findings, additional grass retarders have been investigated and found to be compatible with the inventive coating and are included within the continuing technology of the present invention. One such grass retarder comprises Poly Oxyethylene in a mixture of N-Alkyl Dimethyl Benzyl Ammonium Chloride and Methyl Benzyl Ammonium Chloride, these three chemicals being mixed together in approximately equal volumes. This grass retarder may be mixed with the inventive coating in the proportion of from one part, by volume, for each eight parts, by volume, of the inventive coating up to one part, by volume, for each four parts, by volume, of the inventive coating.

Additionally, Applicant has found a microbiocide which is usable in conjunction with the inventive coating compositions to boost performance as an antifoulant against grass, algae, invertebrates and all other forms of fouling without the use of herbicides or any other chemicals which may be harmful to the environment or detrimental to the mandatory characteristics and functions of the inventive coatings. This microbiocide is sold by Ashland Chemical Company under the name "AMERSTAT 251" and includes the following ingredients: 5-Chloro-2-Methyl-4-Isothiazolin-3-One, 1.5% by weight, 2-Methyl-4-Isothiazolin-3-One, 0.35% by weight, inert ingredients, 98.15% by weight. The inert ingredients are held by the Ashland Chemical Company as a Trade Secret. "AMERSTAT 251" is the subject of EPA Registration No. 1757-79. Furthermore, the density of the "AMERSTAT 251" microbiocide is 100.3333 grains per fluid ounce.

The microbiocide described by the Trademark "AMERSTAT 251" may be incorporated in the inventive coating compositions by providing a mixture of from 1 to 3 fluid ounces of the microbiocide for every 32 fluid ounces of mixed resin, thixotropic and metallic copper particles. Of course, as described herein, one gallon of the inventive resin weighs 4.4 pounds while one gallon of the inventive hardener weighs 3.8 pounds. Applicant has found that the specified microbiocide is chemically compatible with the inventive coating compositions in such a manner that the cross-linking characteristics thereof progress unimpeded by the microbiocide. Applicant has found that other biocides degrade the cross-linking characteristics of the resin and hardener in such a manner so as to drastically decrease the expected life of the coating.

The following listed constituent ingredients as disclosed herein have the following respective weights per quart of volume:

| INGREDIENT | WEIGHT IN POUNDS |
| --- | --- |
| Resin | 2.168 |
| Hardener | 1.9 |
| Amorphous Silica Thixotropic Agent | .0925 |
| Isopropyl Alcohol | 1.676 |
| Copper Particles | 12 |
| pHarlo | 2.3278 |

As described hereinabove, in accordance with the teachings of the present invention, the hardener to resin ratio may be varied anywhere from 4:5 to 1:3, by volume, with no appreciable effect on the effectiveness of the coating. Taking the weight per quart figures set forth above, when the hardener to resin ratio is 4:5, by volume, the mixture of hardener and resin is made up of 41.2%, by weight, hardener and 58.8%, by weight, resin. Where the hardener to resin ratio is 1:3, by volume, a mixture of hardener and resin includes 22.6%, by weight, hardener and 77.4%, by weight, resin. Thus, in the situation where the hardener to resin ratio is 4:5, by volume, the weight of the hardener is 70.1% of the weight of the resin. Where the hardener to resin ratio is 1:3, by volume, the weight of the hardener is 29.1% of the weight of the resin. Thus, in explaining the variability of the ratio of hardener to resin in accordance with the teachings of the present invention, one can state that the weight of the hardener as compared to the weight of the resin may be varied from 29.1% to 70.1% of the weight of the resin.

In a fifth embodiment of the present invention, Applicant has discovered that an environmentally safe, dielectric, 100% solids, flexible, insoluble epoxy resin, containing no EPA Title 111 chemicals, which is specifically formulated to contain thixotropic and anti-wear ingredients, designed to permanently attach to the wetted hull surfaces of all marine vessels and to remain in place and function as an antifoulant for no less than 10 years through means of regulation of the Shore D hardness of the inherent new resin formulation and the new hardener formulation. These formulations are specifically designed to comply with all existing and anticipated regulations and guidelines for Volatile Organic Compound emissions, VOC's. The resin formulation comprises a mixture of Diglycidyl Ether of Bisphenol A, CAS#25068-38-6, synthetic amorphous precipitated silica, CAS#112926-00-8, and inert spherical ceramic particles. An example of inert spherical ceramic particles suitable for use in the present invention is described as small, round, inert, irregular spheres in a size range of −225 to −325 mesh, as manufactured by Owens-Corning. These particles are dielectric, insoluble in water and weigh about 9.6 lbs. per gallon.

The new inventive hardener formulation combines Polyethylenepolyamines, CAS#68410-23-1; Benzyl Alcohol, CAS#100-51-6, Bisphenol A epoxy resin, CAS#25068-38-6 and Piperazineethanamine, CAS#140-31-8.

Diglycidyl Ether of Bisphenol A (DGEBA) is made as follows:

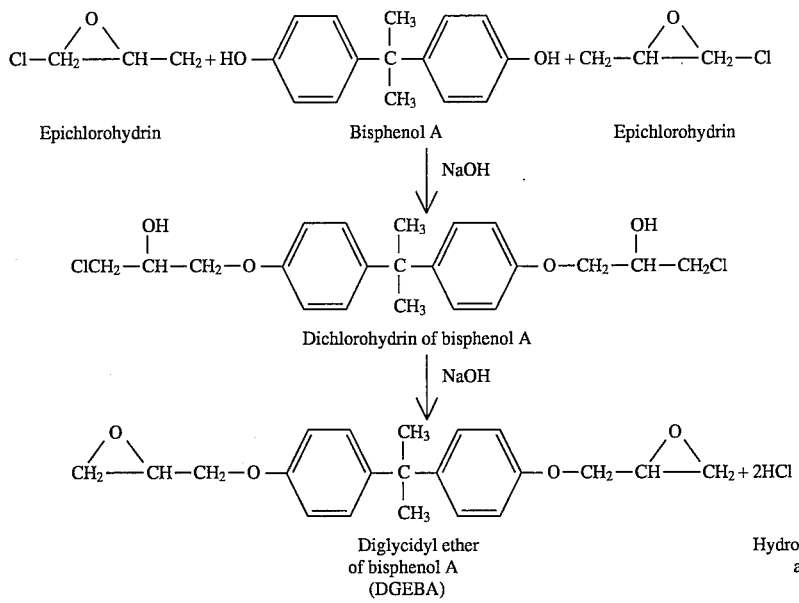

DGEBA is combined with Bisphenol A to create a medium to high molecular weight finished coating as follows:

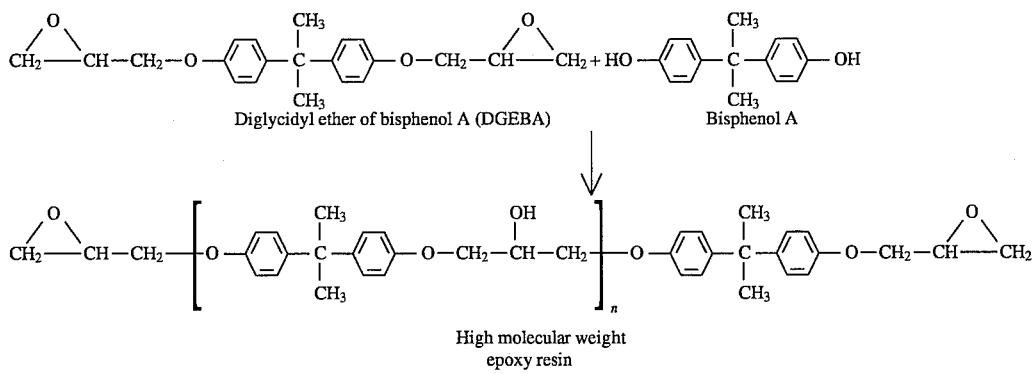

This fifth embodiment of the present invention, first disclosed herein, includes the following ranges of percentages, by weight, in the entire mixture of the constituent ingredients listed:

| | |
|---|---|
| Metallic Copper | 44.97%–74.53% |
| Resin: Diglycidyl Ether of Bisphenol A | 13.53%–29.23% |
| Synthetic Amorphous Precipitated Silica | 0.137%–0.295% |
| Polyethylenepolyamines Hardener Component | 7.91%–17.08% |
| Benzyl Alcohol Hardener Component | 1.77%–3.825% |
| Bisphenol A Epoxy Resin | 1.416%–3.060% |
| Piperazineethanamine Hardener Component | 0.708%–1.530%. |

Depending upon the specific percentages of the constituent ingredients which are employed, the density of the mixed substance will vary from 14.90 pounds per gallon to 32.20 pounds per gallon. For example, where the mixture consists of, by weight, 44.97% Metallic Copper, 29.23% Resin: Diglycidyl Ether of Bisphenol A, 0.295% Synthetic Amorphous Precipitated Silica, 17.08% Polyethylenepolyamines Hardener, 3.825% Benzyl Alcohol, 3.060% Bisphenol A Epoxy Resin, and 1.530% Piperazineethanamine, the density of the finished mixture is 14.90 pounds per gallon. Conversely, where the percentages, by weight, are, 74.53% Metallic Copper, 13.53% Resin: Diglycidyl Ether of Bisphenol A, 0.137% Synthetic Amorphous Precipitated Silica, 7.91% Polyethylenepolyamines Hardener, 1.77% Benzyl Alcohol, 1.416% Bisphenol A Epoxy Resin, and 0.708% Piperazineethanamine, the density of the finished mixture is 32.20 pounds per gallon.

The spherical ceramic particles which are mixed into the resin, as explained above, may be obtained from Owens Corning, in a size and shape in the range of −320 mesh. Additionally, thixotropic silica particles may be substituted for the synthetic amorphous precipitated silica in the same percent range listed for the synthetic amorphous precipitated silica. This is the case where the inventive composition is to be employed as an antifoulant hull coating.

In one aspect of the use of spherical ceramic particles, Applicant has employed such particles in the size −220 mesh, blended into the resin formulation in a weight percentage of from 44.97 to 77.43%, by weight, of the resin weight. Weight percentages toward the higher end of the scale are employed where the anti-wear characteristics of the spherical ceramic particles are important. As explained herein, for typical antifoulant uses, the ceramic particles may be substituted for the silica particles in a volume percentage equal to the volume percentage of the existing silica formulae for enhanced anti-wear characteristics.

Preferably, the coating described as the fifth embodiment is applied or manufactured (mold layup) with a thickness of at least 15 mils so that it resists osmotic pressures, 20 atmospheres of pressure and lasts on a vessel hull for at least 15 years.

In a sixth embodiment of the present invention, first disclosed herein, a fairing compound is disclosed which may be chemically cross-linked with the fifth embodiment described above. As should be understood, the weight percentage of ceramic particles may be substituted directly, by weight, for the weight of the copper particles described in the fifth embodiment.

The flexible marine vessel hull fairing compound may include the following ranges of weight percentages of the constituent ingredients:

| | |
|---|---|
| Inert Solid Ceramic Particles: | 44.97%–74.53% |
| Resin: | 13.667%–29.525% |
| Diglycidyl Ether of Bisphenol A | |
| Hardener: | 7.91%–17.08% |
| Polyethylenepolyamines | |
| Benzyl Alcohol | 1.77%–3.825% |
| Bisphenol A Epoxy Resin | 1.416%–3.060% |
| Piperazineethanamine | 0.708%–1.530% |
| TOTAL: | 100%. |

Depending upon the specific percentages of the constituent ingredients which are employed, the density of the mixed substance will vary from 12.2 pounds per gallon to 29.5 pounds per gallon. For example, where the mixture consists of, by weight, 44.97% inert ceramic particles, 29.525% Resin: Diglycidyl Ether of Bisphenol A, 17.08% Polyethylenepolyamines Hardener, 3,825% Benzyl Alcohol, 3,060% Bisphenol A Epoxy Resin, and 1.530% Piperazineethanamine, the density of the finished mixture is 12.2 pounds per gallon. Conversely, where the percentages, by weight, are, 74.53% inert ceramic particles, 13,667% Resin: Diglycidyl Ether of Bisphenol A, 7.91% Polyethylenepolyamines Hardener, 1.77% Benzyl Alcohol, 1.416% Bisphenol A Epoxy Resin, and 0,708% Piperazineethanamine, the density of the finished mixture is 29.5 pounds per gallon.

The fairing compound is useful to fill areas of a vessel hull which have been corroded or otherwise damaged. The fairing compound is designed to restore the original contours of the vessel hull and resists wear while sealing the hull against water incursion.

As is well known, an increase in solid particles in a hull coating increases the leaden (burdened) weight of a subject vessel and, therefore, more fuel is required to move the hull through the water at a given speed. As such, Applicant preferably uses hollow ceramic spheres as the ceramic particles to reduce the weight percentage of the fairing compound by approximately 4.5%. It is noted, however, that hollow ceramic particles will suffer from destructive compression loads if the particles are subjected to high impact loads as in the stem area of a marine vessel in motion or in the amidships locations in docking maneuvers. In these specific areas and in all areas subject to high impact loadings, it is required that solid ceramic particles be employed. The spherical ceramic particles which are employed to enhance the dielectric nature of the inventive formulation and which enhance the thixotropic and anti-wear nature thereof, are disclosed to have the same particle size of that of the small metallic copper antifoulant particles, namely, preferably in the nature of −300 mesh, although the particles may be employed in the range of −100 mesh to −325 mesh, preferably in the range of −150 to −325 mesh. If desired, the ceramic particles may be provided in a combination of small solid particles and small hollow particles. Applicant has discovered that the use of ceramic particles decreases the rate of leaching of the copper particles into the surrounding body of water thereby decreasing water pollution from the antifoulant releases.

In a further important aspect of the present invention, Applicant has discovered that the self-cleaning nature of the inventive formulation may be enhanced by adjusting the Shore D hardness thereof within the range of 65–85. Generally speaking, the higher the Shore D hardness within the range of 65–85, the greater the self-cleaning nature of the inventive coating. However, certain hulls are, by their nature, somewhat flexible, such as wood planking and thin fiberglass laminates. Under such circumstances, the Shore D hardness must be set toward the lower end of the range, in the range of 65.

Applicant has found that it is possible to adjust the Shore D hardness of the inventive coating compositions by adjusting the weight ratio between the resin and the hardener. The following table shows variations in the ratio between resin weight and hardener weight which result in the corresponding changes in Shore D hardness of the finished coating:

TABLE

| Resin/Hardener Weight Ratio | Shore D Hardness |
|---|---|
| 1.42 | 65 |
| 1.158 | 75 |
| 1.0476 | 85 |

Synthetic amorphous silica is not employed in the fairing formulation because Applicant has determined that a secondary, indirect effect of the ceramic particles is to act as the thixotropic agent. Since the viscosity of the inventive formulations is set at 24,000 CPS (Centipoise) and since this viscosity is too great to allow conventional spray applications, it is further disclosed that the inventive formulations must be heated to 120–150 degrees F. before they are pumped to the external mix spray guns.

In a further aspect, since the ceramic particles are also dielectric in nature as well as fully meeting the established criteria of particle size and water insolubility, they may be substituted directly for the precipitated silica in the antifoulant formulations to increase the inherent anti-wear characteristics of the inventive coating because it is well established that the ceramic particles, solid or hollow, have a surface hardness greater than the extremely soft surface hardness of the amorphous silica. This surface hardness differential is on the magnitude of 6:1. Neither the silica nor the ceramic have any direct effect upon the primary antifoulant characteristic of the inventive coatings. However, the rate of wear, ablative wear rate, of the coating is highly increased by the substitution of the ceramic spheres. This increase in wear rates has been found to provide significant cost savings for the inventive coatings in that their service life may accurately be projected to greater than 10 years in service life for commercial ships. This large increase has a direct beneficial impact on environmental effects as the same coating may be used for a longer time without additions or replacement. As compared with copper oxide-based coatings, which only last about 18 months in commercial services, this family of inventive coatings rather quickly reduces the amount of toxins generated per marine vessel per year and released into environmentally sensitive waters such as harbors, estuaries and marinas. In addition, the inventive coating's long life significantly decreases the dry docking costs for antifoulant coating applications over the economic life of the marine vessel.

The particle size of both the ceramic particles and the silica has been selected to allow commercial spray applications of the inventive coatings to reduce the labor costs associated with roll applications and the costs of current multiple pass thin spray layers of about 0.002"/2 mils wet film thickness. In this important aspect, it has been found that the thickness of the spray applied coating, per spray pass, is critical to keep the labor costs below the costs for specialized spray application equipment so that the savings in labor costs are greater than the investment costs of specialized spray equipment. For example, since the current list prices for Binks plural component spray equipment, such as the tested Model M formulator and the Model 43PAH Automatic Spray Gun, complete with support equipment, is in excess of $15,000.00, the labor savings of the inventive coatings in one spray pass of about 0.006"/6 mils, on the hull application of just one VLCC (very large crude carrier) of about 300,000 square feet, exceeds the cost of the specialized spray equipment.

To earn the savings of these significant cost reductions, Applicant has also found that altering the thixotropic nature of the inventive coatings so that the thickness of the single pass spray coating may be increased to about 6 mils minimum per spray pass, without the entrained metallic copper particles causing sagging or running in the inventive coatings, may be accomplished by altering the total thixotropic nature of the coating at the same basic resin and hardener formulations. As compared with the four Ciba-Geigy products first tested for spray applications, Araldite 106 and 103 resins with their matching hardeners, #951 and#953, respectively, it has been discovered that the Ciba-Geigy resins and hardeners are two distinct formulations which doubles the inventory costs at the outset and these products do not have the proper inherent thixotropic characteristics to allow thick one pass spray coatings. For example, the maximum coating thickness for either of the Ciba formulations is about 2.5 mils wet film thickness per pass which translates into double the labor time and double the labor costs for spray applications on all marine vessels. When commercial ships are considered, these costs are rather significant in view of the total labor increment of the applied coating costs.

Applicant has also discovered that increasing the thixotropic agents in both the inventive resin, whose basic formulation is set forth herein, and the inventive hardener, whose formulation is also fully disclosed herein, to a weight percentage equal to a corresponding volumetric percentage not to exceed 19% total thixotropy, will keep the inventive coatings in place in vertical positions at a standard day temperature of 59 degrees F./15 degrees C. It has also been discovered that at these maximum thixotropic levels, the energy imparted by the spray equipment must be limited as initial surface energy, imparted from heat or high velocity air movement toward the surface, will decrease the thixotropy of the inventive coatings. Because of these precise findings, which have been verified in the hot climate of Antigua and in controlled lab conditions, the thixotropic components of the inventive formulations may be increased to a level of 19% thixotropy by adding more of the specified thixotropic agents to the specified level. The specific gravity of the specified amorphous silica is 2.2 for all calculations.

For further calculations, the following weight to volumetric ratios are applicable:

| | |
|---|---|
| Resin: | 849 ml = 2.2 pounds |
| Hardener: | 833 ml = 1.9 pounds. |

In the fifth and sixth embodiments disclosed hereinabove, the epoxy hardener which is employed includes the following ingredients: Polyethylenepolyamines, Benzyl Alcohol, Bisphenol A epoxy resin and Piperazineethanamine.

The physical data for copper is as follows:

| | |
|---|---|
| Appearance and Odor: | Reddish color, Odorless |
| Specific gravity (H20 = 1): | 8.92 |
| Water solubility: | INSOLUBLE |
| Melting point: | 1982 degrees Fahrenheit |
| % volatile by volume: | 0% |
| Molecular weight: | 63.5 |
| Particle Size | −325 to −150 mesh |
| Purity of Particles | Greater than or Equal to 99% Pure Copper |

The water insoluble thixotropic agent, used in the applied products, in the preferred ratio of 0.04% to 30%, by volume, in the coating composition, is preferably Amorphous Silicone Dioxide. It is not a Crystalline form of Silica. The product is known further by the following trade names: Aerosil, Amorphous Fumed Silica, Aerosol 90, 130, 150, 200, 300, 325, 380, OX50, 130VS, 150VS, 200V, 200 VS, 255VS, 300VS, 400VS, MOX170 or MOX80. The chemical formula is SiO 02 with the following chemical properties:

| | |
|---|---|
| Melting point: | 1700 degrees Celsius |
| VOLUME in water: | INSOLUBLE |
| PH: | 3.6–4.5 |
| Specific Gravity: | Approximately 2.2 |
| Electrical Conductivity: | None |
| Particle Size | copper particle size |

The appearance/odor is: white fluffy powder with no odor. Amorphous silica, unlike crystalline silica, is considered biologically benign.

The preferred mixing sequence for the disclosed adhesive formulations is to add the proper adhesive resin quantity into a large clean mixing container that will not contaminate the liquid. This quantity is referred to as one part. To this add the specified part of metallic copper and where the 106 adhesive resin is employed, add one part thinning agent where spray application will be employed. Stir very slowly from the bottom up using a known art heavy mixing device that lifts particles upwards and does not entrain any air. No less than three minutes per quart is required as the minimum mixing time. For the roll application product, add the specified part catalyzer (hardener) slowly and continue blending for another three minutes or until the coloration is homogeneous. Next, the thixotropic agent is added in the appropriate proportion and blended into the mixture.

Where the 103 adhesive resin is employed, the following sequence is preferred:

1. Place the 103 adhesive resin/amorphous silica (thixotropic agent) mixture into a large, clean mixing container. Allow room for a 20% volumetric expansion.
2. Stir for no less than three minutes per quart.
3. Slowly add the pre-measured copper material and stir until the color is homogeneous.
4. Slowly add the pre-measured 953 adhesive hardener into the mixing container until the mixture is homogeneous or for no less than another four minutes. It is further specified that the mixture be allowed to rest, to allow any air bubbles entrained in the mixture to be released, for no less than two minutes per mixed quart of product and no more than 5 minutes per quart.

For the third and fourth embodiments, the preferred mixing sequence is as follows:

1) Place the resin in an appropriate container;
2) Add the thixotropic agent to the resin and stir;
3) Add the copper to the resin and thixotropic agent and stir;
4) Add the pH reducing agents and/or other algicide and stir;
5) Add the insoluble hardener and stir.

All stirring is to be accomplished employing a stirring mechanism designed to preclude air entrapment.

The following properties are found in all disclosed variations of the inventive formulation.

The specific impact resistance of the inventive product is no less than a SHORE D Hardness value of 80.

The specific elongation of the inventive formulae is up to 9%.

The maximum service temperature to mix, store or apply the formulae is 140 degrees F.

The specified hull coating thickness loss rate is no more than 1.5 mills per year.

The minimum pot life at 70 degrees F. is about 45 minutes.

The mixed viscosity of the adhesive is 3,500 for spray use and 40,000 for heavy brush or roll applications.

The lap shear strength is no less than 2,000 psi for the initial tie coat and 1,000 psi for the fully entrained coats at 80 degrees F.

The Ultimate Tensile strength of the initial tie coat for spray is 6,200 psi at 15 degrees C. and 4,800 psi for the roll or brush coat.

The specific gravity of the spray tie coat components is 1.15 for the resin and 0.93 for a hardener. The specific gravity of the roll tie coat is 1.17 for the resin and 0.92 for the hardener. The resin/hardener ratios and combinations may be altered to tailor the inventive products to and for a specific end use.

A preferred mixing ratio for the inventive spray formulation is preferably: the base 103 adhesive resin—100 parts, the 953 adhesive hardener—50 parts, the water barrier materials (copper)—75 parts, and the thixotropic amorphous silica—up to 25% by volume.

The percentages of deviation within which the inventive formulations remain effective have been fully tested at 20–60%, by volume, proportion of water barrier material content (copper) and the thixotropic agent (silica) may be altered from 30% to 5%, by volume, with no serious consequences. Humidity has no effect on the material performance.

Set forth below are the specific limitations and parameters within which the product may be used. Surface preparation is a known art. If a 20 year coating is applied over a prior coating that will only remain attached, for example, one year, there is a potential for 19 uninterrupted years of troubles and expenses. Sound established marine practices must be used which are those set forth by Lloyds of London accredited surveys. In another example, if steel or aluminum hulls are to be coated, the requirement for an initial metallic primer coat is known and well established in the art. It is imperative, however, to set out specifically that the primers used by the persons responsible for that installation must be chemically compatible and in such a surface state that will allow the inventive formulation to be applied over the cured primer.

If the primer cures with an oily surface, the oily surface must be lightly abraded with 120 grit and equivalent abrasives or etches to remove the slick outer surfaces typical of an epoxy outer layer.

The minimum cure time is specified to be, for ultimate cure of the homogeneous coating, 36 hours at 70 degrees F. for either application method.

The minimum tack time between coats is specified to be ninety minutes at 80 degrees F. in shade conditions. Direct sunlight reduces this time by 50%. Coverage has been found to be 200 square feet per gallon in a wet mill thickness of 3 mills for the tie coat and 100 square feet per mixed gallon for the water barrier coats. Total coats are to be no less than four with eight coats giving a 20 year service life.

The preferred minimum temperature of the formulation components is 60 degrees F. There are no maximum temperatures. However, the copper barrier material adds heat transfer within the liquid thereby reducing its pot life. Direct sunlight has the same effect on the installed product and on the material within a container.

Since the insoluble water barrier materials (copper) are heavier than the entraining adhesive, it is specified that the container holding the hull coating must have a continuously operating agitating/mixing device.

For roll applications, the preferred method is to place the dispensing container on top of an air powered continously operating paint shaker. Applicant has found that unless these specific procedures are fully met, the required uniform nature of the applied product will not meet acceptable specifications with respect to content, holding power and water barrier resistance.

For example, the typical siphon feed air gun can only be used in a filtered spray booth. This regulation eliminates the use of that device in an outdoor boat yard environment. High volume low pressure spray application (HVLP) is preferred. Airless equipment for roll and spray applications may be used if the product viscosity is such that maximum delivery air pressure limits are not exceeded.

For roll only application, the short nap high quality rollers of the resin application nature have been tested and found to be consistent and satisfactory in nature. They are, therefore, specified for the reliable application of the inventive product. Short foam rollers and long fibrous texture types will not work satisfactorily.

For roll only application, it is specified that the container be of disposable or cleanable nature and that the container(s) be handled in full compliance with all pertinent environmental rules and regulations. The same cleaning and disposal procedures are specified for the used roller covers themselves.

For air assisted or air powered application equipment, Applicant specifies that closed cabinet cleaning equipment, recyclable in nature, are to be used to eliminate any VOC releases from the clean up process or where methyl ethyl ketone thinner is employed. The cleaned equipment is specified to be stored in a closed cabinet to prevent cleaning residues from being released into the atmosphere.

Roll or brush application tools are to be cleaned with a water soluble cleaner, also with a primary goal of total environmental safety.

The specific application processes for roll or brush use are: Start with a fully prepared environmental covering for the marine vessel(s) to be coated. In a preferred method, the vessel is to be enclosed within an environmental enclosure such as the Marine Enviro-Shield (TM) or others of a similar nature.

In a preferred method, the inventive coatings are mixed, blended and applied within this enclosure. If the hull's surface has been cleaned, and any osmotic, corrosion or rust damages are repaired, a compatible cleaning fluid environmental in nature, such as isopropyl alcohol must be applied to the hull surfaces to remove all surface contamination. Following this cleaning step, in a preferred method, for steel and aluminum hulls, a compatible primer must then be applied to the hull surfaces. After the primer has fully cured, typically 24 hours, it must be inspected for voids and recoated as necessary. When the primer surfaces are all fully cured, they must be lightly abraded to remove any surface oils or waxes, if any, or to microetch those surfaces for increased bonding strength needs.

When the surfaces meet the specific standards set out above, the inventive formulation is to be mixed as detailed earlier. The specific amount mixed is to be that quantity that can be applied within thirty minutes. If two applications are used, the quantity/time ratio limiting number is 45 minutes. A clear coat is to be thoroughly applied to all surfaces in a wet film thickness of no less than three mills as verified by a wet film gauge. This clear coat is also called a tie coat because this method applies a very strong flexible waterproof high strength epoxy adhesive directly onto the prepared marine vessel surfaces as a means to chemically link all subsequent coats to the substrate. For large marine vessels of 100 feet length overall or large interior pipings for power plants, it is specified that if the tie coat application is not complete after one hour and thirty minutes (the application crosslinking window), tie coat application should stop at that point and place so that recoatings may begin.

It is specified in the preferred method that the above crosslinking time window be decreased slightly for existing ambient temperature above 85 degrees F. and increased below 65 degrees F. If cold temperatures are prevalent, Applicant has had successful test applications by storing the inventive coatings at 70 degrees F.

Since the applicator's skill is a variable, it is suggested that subsequent water barrier coats be applied in such a manner that produces a total wet mill thickness of 21 mills or seven three mill coats that are all chemically cross-linked together into one homogeneous, tough, waterproof surface. Because the inventive product has a characteristic of curing with a slippery surface when the crosslinking time window has passed, and since the slippery surface must be abraded then wiped free of surface contamination, if any, and all subsequent layers are to be applied thereto, significant time and material cost savings result if the inventive crosslinking time window is used in all applications to prevent the underlying layers from excessive crosslinking which will prevent secure bonding between said layers.

The thixotropic consistency of the product and the surface angles combine to form the coating thickness limits for any and all types of application methods. For example, Applicant has done numerous successful 25+mill thick coatings to wet concrete surfaces that were just removed from a total immersion and were actually running with water. There were no sags, no runs and the ultimate surface was hydro-dynamically very smooth and securely attached. The typical viscosity of the "tie" coat product is 45,000 cps at 77 degrees F. for roll or brush purposes and 10% of that number for spray applications. The viscosity of the inventive coatings is determined by means of a Zahn#2 cup.

The percentage of thixotropic particles in the entire mixture may be increased in direct proportion to increases in the respective weight and volume of included metallic copper particles to thereby thicken spray coats of the inventive coating as applied in one spray pass to thereby reduce labor costs and application times. By employing this method aspect of the present invention, the thickness of a spray coating may be increased from 2–3 mils per coat to 6 mils per coat or greater. Application of the inventive coatings using fewer coats of spray dramatically reduces labor costs. Where spray application is employed, Applicant has found that by heating the inventive coatings to within the range of 120 to 150 degrees F. before being pumped to an external mixing spray gun, the viscosity is reduced to 1,500 CPS, a level permitting effective spraying through the spray nozzle.

Of course, as greater percentages of copper particles are employed in the inventive coating composition, it is advantageous to increase the percentage of thixotropic agents so that the heavier composition will not sag when applied to a vessel hull.

For overhead applications, test results show that a wet film thickness of 3 mills is the optimum per layer thickness. Since the "how to" brush, spray, roll application methods are well known, the Applicant states that only the time—thickness—surface angle relationship be observed as stated above. All environmental methods are to be followed explicitly. The last or outermost surface may be treated in one of four methods:

1. The first method for a thinner coating layer of high solids content is to do nothing and allow the water to burnish the surface.
2. The second method is to use a vacuum producing device attached via a secure hose to a surface smoothing tool that uses an abrasive (sanding) open coated material of no less than 120 grit. These tools are specified as the preferred method to reduce the "orange peel" or textured nature of the surfaces.
3. The most preferred method is to apply a total surface layer deposit thickness of greater than 15 mills wet thickness which will allow the inherent nature of the thick coating to become self-smoothing; a surface that needs no further treatment.
4. In a fourth method, the time—thickness—surface angle limits must be carefully observed so that a dry coating of small solid metallic or Teflon particles are deposited upon the outermost coating layer by means of a low pressure, low volume air delivery system of siphon feed or low pressure nature that discharges the particles within a closed structure that is open and at discharge and delivery ends. In a preferred method, a vacuum device draws air through a HEPA filter, through a hose from the above partially closed structure. This assumes that since this process is also done inside the environmental enclosure, airborne discharges, if any, are totally contained. The HEPA filter may be placed in a closed water filled container wherein water pressure and gravity will remove the entrapped particles for recycling purposes.

When the homogeneous surfaces are time cured, which is defined as no less than 36 hours at 70 degrees F., the vessel may be launched using established methods and equipment. The inventive formulation will continue to cure in the water for an additional 30 days.

In a preferred method, the inventive formulations are to be packaged into quart, gallon, five gallon and 55 gallon containers by placing the thixotropic agent into the resin. The water barrier materials (copper) have been found to cause significant coagulation at the bottom of the storage containers. Since material is entrained into the resin for simplicity in mixing, storage or shipping, only the diligence or dedication of a worker will prevent significant quantities of the barrier materials from remaining on or near the bottom of the storage/shipping containers which will result in insufficient water barrier materials being applied to the hulls of marine vessels. Therefore, it is specified that in a preferred method, the water barrier metallic products are premeasured, packaged, stored and shipped separately as component C, component(s) A (adhesive resin and thixotropic agent) and component B (adhesive hardener only). Component C, the water barrier metal powder or flakes, has a separate shipping classification. The containers are specified to be of a sealed metallic nature. The water barrier materials have, in their preferred mixing, shipping and storage method, an indefinite shelf life. If the adhesive resin mixture and the hardener are kept in temperatures below 70 degrees F., shelf life may be expected to be one year or more. It is further specified that the pre-measured correct volumetric quantities be placed into the above shipping and storage containers to eliminate end user mixing ratio errors.

For in-mold method applications, the Applicant notes that since a typical new fiberglass marine vessel lay up (construction) procedure using the inventive products would result in a situation wherein polyester resin hull materials would be placed over the epoxy hull coating within the confines of a female mold, a guaranteed failure would result because polyester resins will not bond to epoxy adhesive resins. Therefore, in the preferred method, Applicant states that an intermediate coating of vinyl ester resin (epoxy modified polyester resin) be applied as the above specified "tie coat" between the inventive epoxy outer surfaces and the polyester boat hull resin using well established lay up schedules and procedures so that no less than a 3 mill wet film intermediate layer is applied therebetween.

To solve the problems set forth above concerning in-mold application process for the inventive coating, a different mold release agent specifically applicable for the inventive epoxy, such as T.R. Industries TR-920 Multi-Pull, must be used as industry standard polyester resin mold releases will not allow the inventive coating to release itself from the mold thereby ruining both the mold and the new hull.

Also, an intermediate bonding agent allowing polyester hull laminate resins to chemically cross-link with the inventive coating must be used, because the vinyl-ester must allow both the inventive epoxy and polyester resins to cross-link with it. Applicant has formulated such an intermediate bonding agent, the formula of which is held as a trade secret but which is made readily available to the public by Applicant under the Trademark "PERMA-HULL MOULD KOTE" by contacting Perma-Hull International, Inc., 6669 Peachtree Industrial Boulevard, Suite 1, Norcross, Ga. 30092.

This method allows all of the insoluble characteristics of the inventive coating to be constructed into the mold in one homogeneous waterproof hull structure rather than as a separate hull made with water permeable ingredients, polyester resin based, with the inventive coating applied post-mold over the water soluble hull areas.

The method incorporating the use of "PERMA-HULL MOULD KOTE" is carried out employing the following steps:

a) Tape the subject marine vessel mold about three to six inches or 76.2 to 152.4 mm ABOVE normal waterline for splash zone extra protection. Tape and or protective paper is to be ABOVE the extra protection zone on the hull;

b) Apply EPOXY SPECIFIC Mold Release, such as T.R. Industries TR-920 Multi-Pull, to the mold area to be coated with inventive coating;

c) Apply inventive formulation, Perma-Hull Top Kote (with copper), in the minimum specified thickness of 15 mils to this area only observing the specified cross-linking window;

d) When the last layer applied is almost tack-free, apply "PERMA-HULL MOULD KOTE"the specified vinyl-ester intermediate bonding coating, to the Top Kote within the cross-linking window for both products. Be particularly careful to apply the vinyl-ester over the inventive coating in the Extra Protection Area;

e) Remove tape and paper from remainder of mold, upper hull area, and re-tape if required, per normal practices so that no gel coat is applied to the vinyl-ester. Apply the correct mold release for polyester to remainder of mold;

f) Spray normal gel coat to mold, being careful not to apply any over the vinyl-ester coating;

g) Follow normal marine hull lay up schedule and apply polyester resin to gel coat and vinyl-ester Mould Kote. Note: if practical, apply polyester hull resin before vinyl-ester has fully cured so that a preferable chemical or a mechanical bond is formed with the vinyl-ester intermediate bonding layer; and h) An extra thickness of polyester resin should be applied in a decreasing thickness manner, tapered to match the 15 mil thickness of the Perma-Hull water barrier with the thickness of the normal hull laminates.

A formula may be employed to give a precise measurement of the "wetted" surface area of a marine vessel as follows: divide the beam of the vessel in half then square it; square the draft of the vessel and add it to the ½ beam squared figure; find the square root of the sum of#2 above and multiply it times the overall length of the vessel times 2; then multiply that result by 1.1.

Another improvement in accordance with the teachings of the present invention is the method of applying a coating of greater than 20 mills wet thickness to rough concrete or other surfaces because Applicant has established that in a 25 mill thickness, his inventive formulations become ultra smooth with a final surface finish of a 15 micro inches or less profile. This is a very low drag finish that has a significant advantage to the end user of these products because it is an established fact that as a hull surface profile changes 10 microns, the change in required power or resultant speed is 1%. If one realizes that a new steel hull is about 75 microns profile at launch and quickly becomes 175 microns within two years, the daily fuel penalty for not using this inventive smooth hull coating is several tons of extra fuel used by a typical ship per day!

The top or final coat may have a no resin 99% metallic outer layer air applied within a limited controlled space that uses environmentally safe techniques described below, to contain and recycle any airborne metallic copper particles.

The specific technique is a method wherein an air assisted delivery system removes the desired amount of metallic water barrier particles from the closed container, cup or reservoir. Then these particles are lightly deposited upon the final outer surface. This surface has been found to have a strong affinity for capturing additional barrier materials if the "time window" specified above is adhered to. The actual percentage of water resistant surfaces has been found to reach 95%+for this final layer. Only flame spray techniques and the inventive sheathing approach this high concentration.

For racing purposes, this final "top dressing" may be changed to inert Teflon. In either case, the final barrier materials are released within a closed device that restricts the release of the final dressing to on the marine vessel surfaces. By means of a low volume vacuum system and HEPA filters, no atmospheric discharges are caused. By means of proper filter mesh selections and cleanings, the solid barrier materials may be recycled.

Of course, epoxy resin based tinting agents may be added to the inventive coating compositions so that the color of the finished coating may be compatible with various colored hull designs. Tinting agents such as black, blue, red, green, brown and gray, and any other desired color, may be suitably employed. Of course, as is known in the art, it is appropriate to apply a first coating to a vessel having one color and a top coat having the color compatible with hull decorations so that the first-mentioned coat acts as a wear indicator, indicating to the user that the top coat has worn away. In the preferred embodiment, tinting agents are added to the antifoulant coating at a ratio of approximately 1 to 8, by volume.

Applicant has found that the improvements disclosed herein over and above those disclosed in the parent application may be applied to the substances disclosed in the parent application to enhance their effectiveness. Thus the discoveries concerning thixotropic particle size relative to copper particle size, use of pH reducing agents and grass retarding agents, hardeners including Aminoethylpiperazine, isopropyl alcohol may be so applied. Isopropyl alcohol may be employed in the range of 0.06% to 1%, by volume, in the mixture.

As such, an invention has been disclosed in terms of products and methods of application which fulfill each and every one of the objects of the invention as set forth hereinabove and provide a new and useful epoxy adhesive-copper hull coating and method of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A coating composition for covering a hull of a marine vessel and rendering it impervious to water incursion while repelling marine organisms, comprising a mixture of:

a) an amount of an epoxy adhesive resin having a weight and comprising a mixture including Diglycidyl Ether of Bisphenol A and Di-N-Butyl Phtalate;

b) a quantity of Polyamide containing hardener from 29.1% to 70.1% the weight of said epoxy adhesive resin, which quantity is sufficient to harden said epoxy adhesive resin;

c) 45–85%, by weight, of marine organism repelling copper particles;

d) 0.04% to 30%, by volume, of a water insoluble thixotropic agent; and e) 0.06% to 1%, by volume, isopropyl alcohol;

said coating composition being coatable on a marine vessel hull, said coating composition holding its shape while curing through operation of said thixotropic agent, said coating composition, in use, rendering a hull impervious to water incursion and repelling marine organisms.

2. The coating composition of claim 1, wherein said hardener comprises:

a) 3–9%, by weight, Amindethylpiperazine;

b) 64–70%, by weight, Aliphatic Polyamide;

c) 12–18%, by weight, Aromatic Alcohol; and d) 9–15%, by weight, Epoxy Resin.

3. The coating composition of claim 1, wherein said thixotropic agent comprises amorphous silica.

4. The coating composition of claim 1, wherein said thixotropic agent comprises particles no larger in size than said copper metal particles whereby dielectric properties of said coating composition are enhanced, said copper metal particles being –325 to –150 mesh in size.

5. The coating composition of claim 1, further including the addition of a pH reducing agent in the pH reducing agent: coating composition ratio of one ounce per quart up to four ounces per quart.

6. The coating composition of claim 1, further including addition of a grass retarder in a grass retarder to coating ratio of from 1:8 to 1:4, by volume.

7. The coating composition of claim 6, wherein said grass retarder comprises a mixture of approximately equal volumes of Poly Oxyethylene, N-Alkyl Dimethyl Benzyl Ammonium Chloride and Methyl Benzyl Ammonium Chloride.

8. The coating composition of claim 1, wherein said copper metal particles are at least 99% pure copper.

9. A coating composition for covering a hull of a marine vessel and rendering it impervious to water incursion while repelling marine organisms, comprising a mixture of:

a) 30%, by volume, of an epoxy adhesive resin comprising a mixture including Diglycidyl Ether of Bisphenol A and Di-N-Butyl Phtalate;

b) 23%, by volume, of Polyamide containing hardener to harden said epoxy adhesive resin;

c) 46%, by volume, of marine organism repelling copper particles;

d) 0.04%, by volume, of a water insoluble thixotropic agent; and e) 0.06%, by volume, isopropyl alcohol;

said coating composition being coatable on a marine vessel hull, said coating composition holding its shape while curing through operation of said thixotropic agent, said coating composition, in use, rendering a hull impervious to water incursion and repelling marine organisms.

10. A coating composition for covering a hull of a marine vessel and rendering it impervious to water incursion while repelling marine organisms, comprising a mixture of:

a) 24%, by volume, of an epoxy adhesive resin comprising a mixture including Diglycidyl Ether of Bisphenol A and Di-N-Butyl Phtalate;

b) 24%, by volume, of Polyamide containing hardener to harden said epoxy adhesive resin;

c) 48%, by volume, of marine organism repelling copper particles;

d) 3% by volume, of a water insoluble thixotropic agent; and e) 1%, by volume, isopropyl alcohol;

said coating composition being coatable on a marine vessel hull, said coating composition holding its shape while curing through operation of said thixotropic agent, said coating composition, in use, rendering a hull impervious to water incursion and repelling marine organisms.

11. A coating composition for covering a hull of a marine vessel and rendering it impervious to water incursion while repelling marine organisms, comprising a mixture of, by weight:
   a) 13.53% to 29.23% epoxy adhesive resin comprising a mixture including Diglycidyl Ether of Bisphenol A;
   b) 7.91% to 17.08% polyethylenepolyamine hardener component;
   c) 44.97% to 74.53% marine organism repelling copper particles;
   d) 0.137% to 0.295% of a water insoluble thixotropic agent;
   e) 1.77% to 3.825% Benzyl alcohol;
   f) 1.416% to 3.060% Bisphenol A Epoxy Resin; and
   g) 0.708% to 1.530% Piperazineethanamine hardener component;

said coating composition being coatable on a marine vessel hull, said coating composition holding its shape while curing through operation of said thixotropic agent, said coating composition, in use, rendering a hull impervious to water incursion and repelling marine organisms.

12. The coating composition of claim 11, wherein said thixotropic agent comprises synthetic amorphous precipitated silica.

13. The coating composition of claim 11, further including the addition of a pH reducing agent in the pH reducing agent: coating composition ratio of one ounce per quart up to four ounces per quart to reduce pH of said composition to within the range of 2 to 5.

14. The coating composition of claim 11, further including addition of a microbiocide in a microbiocide to coating ratio of from 1:32 to 3:32, by volume.

15. The coating composition of claim 11, wherein said microbiocide comprises a mixture of 1.5%, by weight, 5-Chloro-2-Methyl-4-Isothiazolin-3-One, 0.35%, by weight, 2-Methyl-4-Isothiazolin-3-One, balance inert.

16. A fairing composition for covering portions of a hull of a marine vessel and rendering said portions impervious to water incursion while filling depressions and voids therein, comprising a mixture of, by weight:
   a) 13.667% to 29.525% epoxy adhesive resin comprising a mixture including Diglycidyl Ether of Bisphenol A;
   b) 7.91% to 17.08% polyethylenepolyamine hardener component;
   c) 44.97% to 74.53% inert ceramic particles;
   d) 1.416% to 3.060% Bisphenol A Epoxy Resin;
   e) 1.77% to 3.825% Benzyl alcohol; and
   f) 0.708% to 1,530% piperazineethanamine;

said fairing composition being coatable on a marine vessel hull, said fairing composition holding its shape while curing through reaction of resin and hardener, said fairing composition, in use, rendering a hull impervious to water incursion and filling depressions and voids therein.

17. The fairing composition of claim 16, wherein at least some of said ceramic particles are hollow.

18. The fairing composition of claim 17, wherein said ceramic particles have a particle size of −100 mesh to −300 mesh.

* * * * *